Oct. 4, 1955 P. W. WHITE Re. 24,071

BUCKLES

Original Filed Oct. 17, 1950

INVENTOR.
Paul W. White

BY
Mason, Kolehmainen, Rathburn & Wyss
Att'ys

United States Patent Office

Re. 24,071
Reissued Oct. 4, 1955

24,071

BUCKLES

Paul W. White, New Haven, Conn., assignor to Parva Products Company, Chicago, Ill., a corporation of Delaware Original No. 2,654,928, dated October 13, 1953, Serial No. 190,461, October 17, 1950. Application for reissue July 2, 1954, Serial No. 441,193

7 Claims. (Cl. 24—194)

Matter enclosed in heavy brackets [ ] appears in the original patent but forms no part of this reissue specification; matter printed in italics indicates the additions made by reissue.

This invention relates to slide buckles, more particularly to slide buckles designed for use on shoes and the like, specifically ladies' shoes, and the invention has for an object the provision of improved slide buckles of this character.

It has long been recognized by shoe manufacturers and shoe retailers, as well as by the feminine purchasing public, that slide buckles, if embodying the same advantages as to ease of threading and freedom from slippage would be tremendously superior to conventional prong type buckles, due to the universality of slide buckle adjustment and the elimination of the necessity of providing properly spaced prong receiving holes in the shoe straps. The fact that it is often necessary to punch or otherwise form additional holes in a shoe strap when fitting the shoes to a prospective customer and that the shoes may thereafter be rejected and even returned after purchase has been a major source of loss to the retailers of shoes, since in many cases the extra holes render the shoes unsalable. Furthermore, instances arise due to the temporary condition of the feet of the wearer when additional holes must be provided in order to permit wearing of the shoes, which additional holes are unsightly after the feet have returned to a normal condition.

The difficulties, however, involved in the provision of small and attractive slide buckles which will accommodate shoe straps of different thicknesses and which will not slip when subjected to the varying degrees of tension that occur during normal movements of the foot, have heretofore been prohibitive, and consequently prong type buckles with all of their inherent disadvantages have been used almost exclusively on ladies' shoes.

Accordingly, it is a further object of the present invention to provide an improved slide buckle for ladies' shoes which may be easily threaded and adjusted, which will securely hold straps of varying thicknesses against slippage under varying degrees of tension, which is attractive in appearance, and which will add to the comfort and convenience of the wearer.

In carrying out the invention in one form, a slide buckle is provided including a pair of cooperating strap engaging cross bars, one of which includes a strap engaging surface inclined relative to the path of movement of the cross bars to effect a wedge-like clamping of a strap between the two cross bars upon relative sliding movement thereof when the strap is tensioned, and the inclined surface on one of the cross bars is provided at its forward edge with an abrupt shoulder extending substantially at right angles to the path of movement of the cross bars, which shoulder is disposed in the path of movement of the other cross bar to provide a positive limit to the relative movement of the cross bars even though the strap is subjected to excessive tension.

More specifically, the slide buckle provides a pair of frames having alignable strap receiving openings therethrough and the cross bar having the inclined surface and abrupt shoulder defines the front edge of the strap receiving opening in one of the frames, while the other strap engaging cross bar defines the rear edge of the strap receiving opening in the other of the frames, and guide means are provided on the two frames disposed substantially entirely rearwardly of the strap receiving openings for slidably maintaining the frames in face-to-face relation, whereby the clamping portions of the frames forwardly of the guide means are unrestrained against limited lateral separation when the strap is tensioned. Preferably the frames are formed of sheet metal so that flexure of the frames at their forward portions to effect the limited lateral separation thereof under tension is effective to lock the strap in clamped position to prevent slippage during momentary releases of the tension.

For a more complete understanding of the invention, reference should now be had to the drawing, in which.

Figure 1:
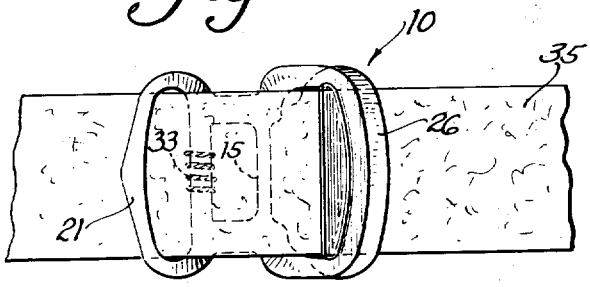
Fig. 1 is a plan view of a buckle embodying the present invention applied to a strap such as is commonly found on ladies' shoes.

Referring now to the drawing, the invention is shown as embodied in a buckle 10 which comprises a main frame 11 and a second frame or slide 12. As shown, the main frame 11 includes a forward portion having a strap receiving opening 13 which is defined by a front cross bar 14, a second cross bar 15, and opposed side bar portions 16 and 17. Rearwardly of the strap receiving opening 13 and extending from opposed ends of the cross bar 15 are a pair of side bar portions 18 and 19 which terminate in a strap attaching bar 20 and a loop or hold-down portion 21 extends rearwardly from the cross bar 20 to provide a second strap receiving opening 22.

As shown, the side bar portions 18 and 19 are provided with downwardly and inwardly extending flange portions 23 and 24 which form guide channels for receiving portions of the slide 12, as will be more fully described hereinafter, and it will be noted that these flange portions 23 and 24 are disposed substantially entirely rearwardly of the strap receiving opening 13.

The second frame or slide 12 is provided with a strap receiving opening 25, the forward edge of which is defined by a pull-up cross bar 26 and the rearward edge of which is defined by a cross bar 27 having an upwardly extending strap engaging portion 28. Likewise, the frame 12 is provided with guide portions or legs 29 and 30 which extend rearwardly from the forward portion of the slide which includes the strap receiving opening 25, the legs 29 and 30 being adapted to slide within the channels provided by the flanges 23 and 24 when the frame 11 and the slide 12 are assembled.

Figure 2:
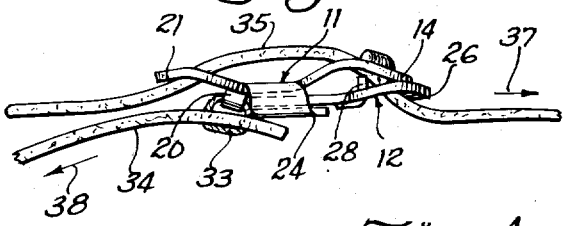
Fig. 2 is a side elevational view of the buckle and strap shown in Fig. 1.
Figure 5:
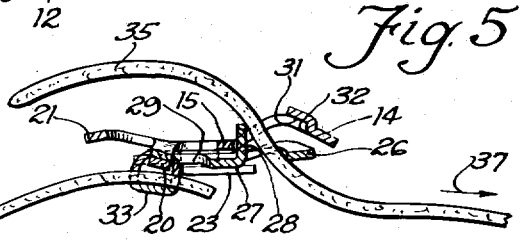
Figs. 5 and 6 are longitudinal vertical sectional views showing the buckle and strap in threaded and clamping positions, respectively.
Figure 6:
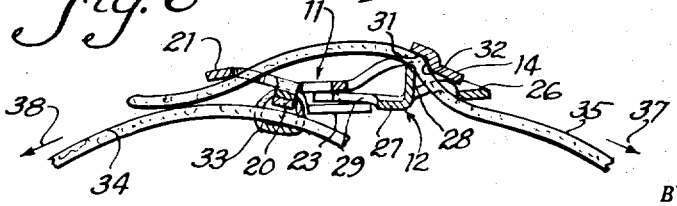

In accordance with the present invention, the strap engaging cross bar 14 on the frame 11 is provided with a clamping surface 31 which, as shown best in Figs. 5 and 6, is inclined with respect to the relative path of movement of the frame and slide provided by the flanges 23 and 24 and the legs 29 and 30, and this inclined surface 31 terminates in an abrupt shoulder portion 32 which extends substantially perpendicular to the path of relative movement of the frame and slide and which is disposed in the path of movement of the upturned strap engaging portion 28 on the cross bar 27 of the slide 12. As shown best in Figs. 2, 3 and 6, the front cross bar 26 on the slide 12 moves to a position forwardly of the front edge of the cross bar 14 on the frame 11 when the frames are in clamping relation, and in order to prevent discomfort to the wearer due to lateral and longitudinal tilting of the buckle during normal walking movements, the cross bars 14 and 26 are provided with curved front edges and are arcuately formed laterally, as will be more fully described hereinafter.

Figure 3:
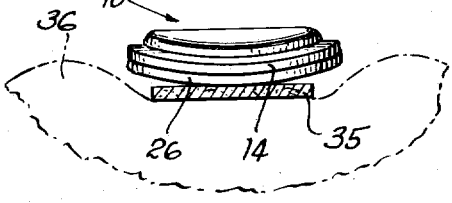
Fig. 3 is a front elevational view showing the buckle and strap applied to the foot of a wearer of the shoe.
Figure 4:
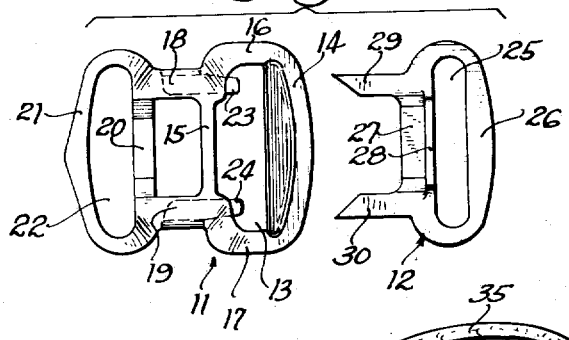
Fig. 4 is an exploded plan view showing the frames of the buckle in disassembled relation.

After the buckle has been assembled by disposing the frame 11 and the slide 12 in face-to-face relation and bending the flanges inwardly to form the channels as heretofore described, it will be observed that the upstanding strap engaging portion 28 of the slide 12 extends into the strap receiving opening 13 in the frame 11 and is adapted to engage at the extremities of its sliding movement with the cross bar 15 on the frame 11 and with the shoulder portion 32 on the cross bar 14. Thus, the frame and slide are maintained in assembled relation. In applying the buckle to a shoe strap it is necessary only to secure the free end of one of the shoe straps to the attaching bar 20 by suitable stitching 33, as shown in Figs. 5 and 6, the strap attaching bar 20 being provided with a downwardly deformed central portion to provide sufficient clearance of the strap portion 34 with respect to the hold-down portion 21 after the strap has been threaded through the buckle. With the buckle secured by the stitching 33 to the strap portion 34, the free end of the other strap portion 35 may be threaded through the strap receiving openings 25 and 13 in the slide 12 and the frame 11, respectively, as shown in Fig. 5, the openings 25 and 13 being in alignment when the frame and slide are in the threading position. The free end of the strap portion 35 may then be pulled through the buckle until sufficient tension is exerted on the strap to cause a compression of the flesh, as shown in Fig. 3, the flesh of the foot being indicated by the broken lines 36, and upon release of the free end of the strap portion 35 this portion will tend to move in the direction indicated by the arrows 37 in Figs. 2, 5 and 6. Movement of the strap portion 35 in this direction, which is, of course, accompanied by the tendency of the strap portion 34 to move in the direction indicated by the arrows 38 in Figs. 2, 5 and 6, will, by reason of engagement of the strap portion 35 with the pull-up bar 26 on the slide 12, cause relative movement between the slide 12 and the frame 11 so as to move the slide and frame to the clamping position shown in Fig. 6, in which position it will be seen that the upstanding strap engaging portion 28 on the slide has moved underneath the sloping portion 31 on the frame 12 so as to provide a wedging clamping action of the strap between the portion 28 and the surface 31; and it will likewise be observed that the strap is firmly clamped between the portion 28 and the abrupt shoulder 32 on the cross bar 14.

While slide buckles have previously been provided having inclined strap engaging portions for providing a wedge-like clamping action, it has been found that buckles of this type will not prevent slippage when applied to straps of different thicknesses, since the angularity of the inclined portion necessary to prevent slippage varies with different strap thicknesses and an inclination which will apply to straps of varying thickness is of such small angularity that the slide may pull entirely through and out of the frame when it is subjected to excessive tension. In accordance with the present invention, an inclination of approximately twenty-five degrees is employed and a positive limitation of relative movement between the slide and the frame, together with a locking action, is provided by the abrupt shoulder portion [14] *32*. Thus, when sufficient tension in the direction indicated by the arrows 37 and 38 is provided on the strap portion, the slide and frame will not only move so as to firmly clamp the strap against the inclined portion 31 and the shoulder portion 32, but at the same time lateral separation of the slide and frame adjacent the respective clamping portions thereof will be effected due to the fact that the guide formed by the flanges 23 and 24 and the guide legs 29 and 30 is disposed substantially entirely rearwardly of the strap receiving openings 13 and 25 so that the forward clamping portions of the slide and frame are free to undergo a limited lateral separation. Preferably, the slide and frame are formed of resilient sheet metal so that lateral flexure of the slide 11 occurs under tension. With this construction it has been found that a locking action occurs particularly on thin straps so that release of the tension will not result in release of the strap until manual pressure is applied to the front edge of the cross bar 26 on the slide to effect rearward movement of the slide relative to the frame. The provision of the abrupt shoulder 32 at the front edge of the inclined surface 31, together with the arrangement for permitting limited lateral separation of the slide and frame, provides an effective clamping and locking action which has not heretofore been possible in slide buckles and which makes possible for the first time the provision of a slide buckle which attains all of the advantages of the prong type buckles commonly used on ladies' shoes without any of the disadvantages. It will be understood, of course, that after the strap has been pulled up tight and released to permit the above described clamping action, the free end of the strap portion 35 may be inserted behind the hold-down bar 21, as shown in Figs. 1 and 6.

Referring now to Fig. 3, the relative relation of the strap portions and the buckle 10 to the flesh of the wearer when the strap is under tension is illustrated, and it will be observed that the lateral arcuate curvature of the front cross bars 26 and 14 on the slide 12 and the frame 11 provides a maximum clearance between the edges of the buckle and the flesh of the wearer's foot so that engagement of the buckle edges with the flesh of the wearer is minimized, thereby avoiding undue discomfort.

While a particular embodiment of the invention has been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent is:

1. A slide buckle comprising a pair of slidably engaged frames disposed in face-to-face relation, said frames having alignable strap-receiving openings therethrough, one of said frames having a front cross bar defining the front edge of said opening therein and including a portion inclined with respect to the path of relative movement of said frames, said inclined portion terminating in an abrupt shoulder extending substantially at right angles to said path of movement, the other of said frames having a cross bar defining the rear edge of said opening therein and including a strap-engaging portion movable under said inclined portion into juxtaposition with said shoulder to clamp a strap against said inclined portion and said shoulder, said shoulder providing a positive stop to limit the clamping movement of said frames under excess tension, and guide means on said frames disposed substantially entirely rearwardly of said openings for slidably maintaining said frames in said face-to-face relation for sliding movement in said path whereby the clamping portion of said frames forwardly of said guide means are unrestrained against limited lateral separation when the strap is tensioned.

2. A slide buckle comprising a pair of slidably engaged frames disposed in face-to-face relation, said frames having alignable strap-receiving openings therethrough, one of said frames having a front cross bar defining the front edge of said opening therein and including a portion inclined with respect to the path of relative movement of said frames, said inclined portion terminating in an abrupt shoulder extending substantially at right angles to said path of movement, the other of said frames having a cross bar defining the rear edge of said opening therein and including a strap-engaging portion movable under said inclined portion into juxtaposition with said shoulder to clamp a strap against said inclined portion and said shoulder, said shoulder providing a positive stop to limit the clamping movement of said frames under excess tension, channel shaped guide means extending along opposed portions of one of said frames, and leg portions extending rearwardly from said opening in the other of said frames for cooperation with said guide means to maintain said frames in said face-to-face relation, said guide means on said one frame terminating adjacent the rear edge of the opening therein to leave the clamping portions of said frames forwardly of said openings free of restraint against limited lateral separation.

3. A slide buckle comprising a pair of slidably engaged frames formed of thin sheet metal and disposed in face-to-face relation, said frames having alignable strap-receiving openings therethrough, one of said frames having a front cross bar defining the front edge of said opening therein and including a portion inclined with respect to the path of relative movement of said frames, said inclined portion terminating in an abrupt shoulder extending substantially at right angles to said path of movement, the other of said frames having a cross bar defining the rear edge of said opening therein and including a strap-engaging portion movable under said inclined portion into juxtaposition with said shoulder to clamp a strap against said inclined portion and said shoulder, said shoulder providing a positive stop to limit the clamping movement of said frames under excess tension, and guide means on said frames disposed substantially entirely rearwardly of said openings for slidably maintaining said frames in said face-to-face relation for sliding movement in said path whereby the clamping portions of said frames forwardly of said guide means are unrestrained against limited lateral separation when the strap is tensioned, whereby the application to the strap of tension sufficient to clamp the strap firmly between said strap-engaging portion and said shoulder will cause relative lateral flexure of said forward portions thereby to lock the strap in clamped position to prevent slippage upon momentary releases of the tension.

4. A slide buckle comprising a pair of slidably engaged frames formed of thin sheet metal and disposed in face-to-face relation, said frames having alignable strap-receiving openings therethrough, one of said frames having a front cross bar defining the front edge of said opening therein and including a portion inclined with respect to the path of relative movement of said frames, said inclined portion terminating in an abrupt shoulder extending substantially at right angles to said path of movement, the other of said frames having a cross bar defining the rear edge of said opening therein and including a strap-engaging portion movable under said inclined portion into juxtaposition with said shoulder to clamp a strap against said inclined portion and said shoulder, said shoulder providing a positive stop to limit the clamping movement of said frames under excess tension, channel shaped guide means extending along opposed portions of one of said frames, and leg portions extending rearwardly from said opening in the other of said frames for cooperation with said guide means to maintain said frames in said face-to-face relation, said guide means on said one frame terminating adjacent the rear edge of the opening therein to leave the clamping portions of said frames forwardly of said openings free of restraint against limited lateral separation, whereby the application to the strap of tension sufficient to clamp the strap firmly between said strap-engaging portion and said shoulder will cause relative lateral flexure of said forward portions thereby to lock the strap in clamped position to prevent slippage upon momentary releases of the tension.

5. A slide buckle comprising a pair of slidably engaged frames disposed in face-to-face relation, said frames having alignable strap-receiving openings therethrough, one of said frames having a front cross bar defining the front edge of said opening therein and including a portion inclined with respect to the path of relative movement of said frames, said inclined portion terminating in an abrupt shoulder extending substantially at right angles to said path of movement, the other of said frames having a cross bar defining the rear edge of said opening therein and including a strap-engaging portion movable under said inclined portion into juxtaposition with said shoulder to clamp a strap against said inclined portion and said shoulder, said shoulder providing a positive stop to limit the clamping movement of said frames under excess tension, said other frame having a front cross bar defining the forward edge of the said opening therein and movable under said front cross bar of said one frame to a position forwardly thereof, and guide means on said frames disposed substantially entirely rearwardly of said openings for slidably maintaining said frames in said face-to-face relation for sliding movement in said path whereby the clamping portions of said frames forwardly of said guide means are unrestrained against limited lateral separation when the strap is tensioned, said two front cross bars having rearwardly curved front edges and being of lateral arcuate formation.

*6. A slide buckle comprising a pair of slidably engaged frames disposed in face-to-face relation, said frames having alignable strap-receiving openings therethrough, one of said frames having a front cross bar defining the front edge of said opening therein and including a portion inclined with respect to the path of relative movement of said frames, said inclined portion terminating in an abrupt shoulder extending substantially at right angles to said path of movement, the other of said frames having a cross bar defining the rear edge of said opening therein and including a strap-engaging portion movable under said inclined portion into juxtaposition with said shoulder to clamp a strap against said inclined portion and said shoulder, said shoulder providing a positive stop to limit the clamping movement of said frames under excess tension, channel shaped guide means formed integral with one of said frames and extending along opposed portions of said one frame, and elongated leg portions extending rearwardly from said opening in the other of said frames for cooperation with said guide means to maintain said frames in said face-to-face relation, said guide means on said one frame terminating rearwardly of the front edge of said one frame to leave the clamping portions of said frames forwardly of said guide means free of restraint against limited lateral separation.*

*7. A slide buckle comprising a pair of slidably engaged frames formed of thin sheet metal and disposed in face-to-face relation, said frames having alignable strap-receiving openings therethrough, one of said frames having a front cross bar defining the front edge of said opening therein and including a portion inclined with respect to the path of relative movement of said frames, said inclined portion terminating in an abrupt shoulder extending substantially at right angles to said path of movement, the other of said frames having a cross bar defining the rear edge of said opening therein and including a strap-engaging portion movable under said inclined portion into juxtaposition with said shoulder to clamp a strap against said inclined portion and said shoulder, said shoulder providing a positive stop to limit the clamping movement of said frames under excess tension, channel shaped guide means formed integral with one of said frames and extending along opposed portions of said one frame, and elongated leg portions extending rearwardly from said opening in the other of said frames for cooperation with said guide means to maintain said frames in said face-to-face relation, said guide means on said one frame terminating rearwardly of the front edge of said*

*one frame to leave the clamping portions of said frames forwardly of said guide means free of restraint against limited lateral separation, whereby the application to the strap of tension sufficient to clamp the strap firmly between said strap-engaging portion and said shoulder will cause relative lateral flexure of said forward portions thereby to lock the strap in clamped position to prevent slippage upon momentary releases of the tension.*

References Cited in the file of this patent or the original patent:

UNITED STATES PATENTS 967,588 Van Duzer ---------- Aug. 16, 1910

978,101 Abell ---------- Dec. 6, 1910
993,320 Brown ---------- May 23, 1911
1,103,275 Dunn ---------- July 14, 1914
1,132,856 Kerngood et al. ---------- Mar. 23, 1915
2,361,895 White ---------- Oct. 31, 1944

FOREIGN PATENTS 502,031 Germany ---------- July 8, 1930
336,675 Great Britain ---------- Oct. 20, 1930